(12) United States Patent
Matsuyama et al.

(10) Patent No.: US 6,327,379 B2
(45) Date of Patent: *Dec. 4, 2001

(54) PATTERN INSPECTION METHOD AND APPARATUS

(75) Inventors: Takayoshi Matsuyama; Ken-ichi Kobayashi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,553

(22) Filed: Aug. 8, 1997

(30) Foreign Application Priority Data

Dec. 25, 1996 (JP) ................................. 8-346029

(51) Int. Cl.$^7$ ..................................... G06K 9/00
(52) U.S. Cl. ........................................ 382/144; 382/209
(58) Field of Search .................... 382/144, 145, 382/147, 149, 151, 205, 218, 209, 282, 283; 348/125, 126, 128, 129, 130; 356/237.1, 237.2, 243.1, 243.4, 390, 394, 398

(56) References Cited

U.S. PATENT DOCUMENTS

| 4,347,001 | 8/1982 | Levy et al. ........................... 356/398 |
| 4,448,532 | 5/1984 | Joseph et al. ......................... 356/394 |
| 4,532,650 | 7/1985 | Wihl et al. ............................ 382/144 |
| 4,555,798 | 11/1985 | Broadbent, Jr. et al. ............. 382/144 |
| 4,805,123 | 2/1989 | Specht et al. ......................... 382/144 |
| 4,926,489 | 5/1990 | Danielson et al. .................... 382/144 |
| 5,568,566 | * 10/1996 | Hori et al. ............................ 382/282 |

FOREIGN PATENT DOCUMENTS

| 1-248616 | 10/1989 | (JP) . |
| 5-027409 | 2/1993 | (JP) . |
| 6-20934 | 1/1994 | (JP) . |

* cited by examiner

Primary Examiner—Samir Ahmed
(74) Attorney, Agent, or Firm—Armstrong, Westerman, Hattori, McLeland & Naughton, LLP.

(57) ABSTRACT

An actual pattern image including an auxiliary pattern in a periphery of a pattern of an object to be inspected is recognized. The image of the auxiliary pattern is deleted from the recognized image and an auxiliary-pattern-image-deleted recognized image is produced. An inspection image to be used for inspection is produced from design data from which the auxiliary pattern is removed. The auxiliary-pattern-image-deleted recognized image is compared with the inspection image.

8 Claims, 12 Drawing Sheets

(EXPOSURE)

(EXPOSURE)

4 0

□ ; 0
▦ ; 1

PATTERN INSPECTION METHOD AND APPARATUS

BACKGROUND OF THE INVENTION

1. Field of the Invention

The present invention relates to a pattern inspection method and apparatus, and, in particular, to an inspection method and apparatus of a circuit pattern with an auxiliary pattern. The circuit pattern is a circuit pattern formed in a mask or the like and used in manufacturing of a semiconductor device.

Recently, high-density integration of semiconductor devices has been developed. As a result, circuit patterns has become finer. As shown in FIG. 1, when using a mask of a pattern of rectangles 10 and performing an exposure, a pattern 11 is formed on a wafer. Due to limitations of resolution of an exposure device, as pattern becomes finer, the rounded pattern shapes 11 occur. When such a phenomenon occurs in a circuit pattern, the corners are rounded. As a result, although electrical connection is performed, it is likely that problems in circuit characteristics will occur.

In order to solve this problem, that is, in order to form a circuit pattern according to design, as shown in FIG. 2, a technique of adding an auxiliary pattern 12 has been used. The auxiliary pattern 12 includes small rectangles, each of which is positioned near a respective corner of the rectangles of the pattern 10. As a result of adding the auxiliary pattern 12, a pattern 13 formed on a wafer is approximately rectangular.

In order to perform inspection as to whether or not defects are present in a circuit pattern including an auxiliary pattern, a pattern inspection method which considers the presence of the auxiliary pattern is needed.

2. Description of the Related Art

Up to this time, inspection of a circuit pattern including an auxiliary pattern has been performed by the same method as that for an ordinary circuit pattern not including an auxiliary pattern. Specifically, as shown in FIG. 3, an image of a pattern of a mask is recognized in a process 20. Thereby, a recognized image 23 including a pattern image 21 and an auxiliary pattern image 22 is obtained. On the other hand, design data including the auxiliary pattern is copied in a process 25. Then, in a process 26, the design data is converted into inspection data which is suitable for conducting inspection of the circuit. Then, in a process 27, the inspection data is converted into an image, and thus, an inspection image 28 including a pattern image 21A and a auxiliary image 22A is obtained. In a process 29, the recognized image 23 is compared with the inspection image 28, and thus, it is determined whether or not defects are present in a circuit pattern of the mask.

The design data which is converted in the process 26 is design data including the auxiliary pattern. The amount of data of this design data is several times larger than the amount of data of the ordinary design data not including the auxiliary pattern. As a circuit pattern becomes finer as mentioned above, the amount of data of the ordinary design data not including the auxiliary pattern increases. Accordingly, the amount of data of the design data including the auxiliary pattern is enormous. As a result, a very long time is required for the data conversion in the process 26, and thus, a very long time is required for the pattern inspection.

Further, due to limitation of data processing capability of the pattern inspection apparatus, as a circuit pattern becomes finer, the petter inspection is performed by dividing one mask into a plurality of divisions and data processing is performed. In such a situation, because the amount of data increases when design data including the auxiliary pattern is processed as mentioned above, it is necessary to divide one mask into an increasing number of divisions. Thereby, a longer time is required for the pattern inspection.

Further, because each rectangle of the auxiliary pattern is very small in comparison to the ordinary pattern, the auxiliary pattern may result in false defects in the pattern inspection. Thus, reliability of the pattern inspection is degraded.

SUMMARY OF THE INVENTION

An object of the present invention is to provide a pattern inspection method and apparatus in which the above-described problems are solved.

In a pattern inspection according to the present invention:

an actual pattern image including an auxiliary pattern in a periphery of a pattern of an object to be inspected is recognized;

the image of the auxiliary pattern is deleted from the recognized image and an auxiliary-pattern-image-deleted recognized image is produced;

an inspection image to be used for inspection is produced from design data from which the auxiliary pattern is removed; and the auxiliary-pattern-image-deleted recognized image is compared with the inspection image.

In this arrangement, an image, obtained from deleting an auxiliary pattern image from a pattern image which includes the auxiliary pattern in a periphery of a pattern, is inspected. Therefore, an image to be compared with the above-mentioned image is an image which is produced from design data from which the auxiliary pattern has been removed. The amount of data of the design data without the auxiliary pattern is very small in comparison to the design data with the auxiliary pattern. Accordingly, a time required for producing the inspection image from the design data can be decreased. Thereby, a time required for the inspection of the object to be inspected can be decreased. Thus, efficiency of the pattern inspection can be improved. Further, because the comparison is performed on the images without the auxiliary patterns, occurrence of false defects is reduced. Thereby, the inspection of the circuit pattern of the mask is performed with high accuracy, and reliability of the inspection can be improved.

In another pattern inspection according to the present invention:

A picture of one position of an object to be inspected is taken through a first optical system, and an actual pattern image including an auxiliary pattern in a periphery of a pattern is recognized.

The image of the auxiliary pattern is deleted from this recognized image, and a first auxiliary-pattern-image-deleted recognized image is produced.

A picture of another position, which corresponds to the one position, of an object to be inspected, is taken through a first optical system, and an actual pattern image including an auxiliary pattern in a periphery of a pattern is recognized.

The image of the auxiliary pattern is deleted from this recognized image, and a second auxiliary-pattern-image-deleted recognized image is produced.

The first auxiliary-pattern-image-deleted recognized image is compared with the second auxiliary-pattern-image-deleted recognized image.

In this arrangement, the first auxiliary-pattern-image-deleted recognized image is compared with the second auxiliary-pattern-image-deleted recognized image. As a result, because the comparison is performed on the images without the auxiliary patterns, occurrence of false defects is reduced. Thereby, the inspection of the circuit pattern of the mask is performed with high accuracy, and reliability of the inspection can be improved.

Other objects and further features of the present invention will become more apparent from the following detailed description when read in conjunction with the accompanying drawings.

DETAILED DESCRIPTION OF THE PREFERRED EMBODIMENTS

Figure 1:
FIG. 1 shows a relationship between a pattern of a mask and a pattern formed on a wafer (through the mask) in a case where a fine circuit pattern is formed.
Figure 1:
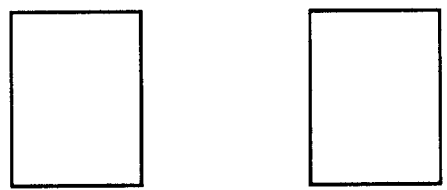
Figure 1:
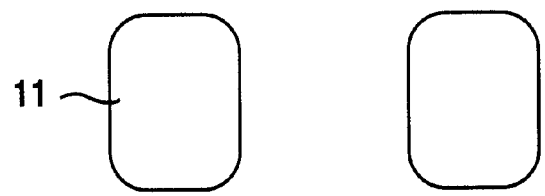
Figure 1:
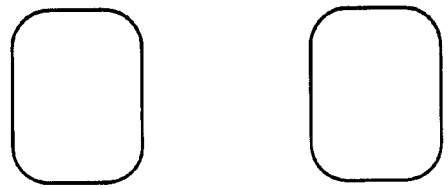
Figure 2:
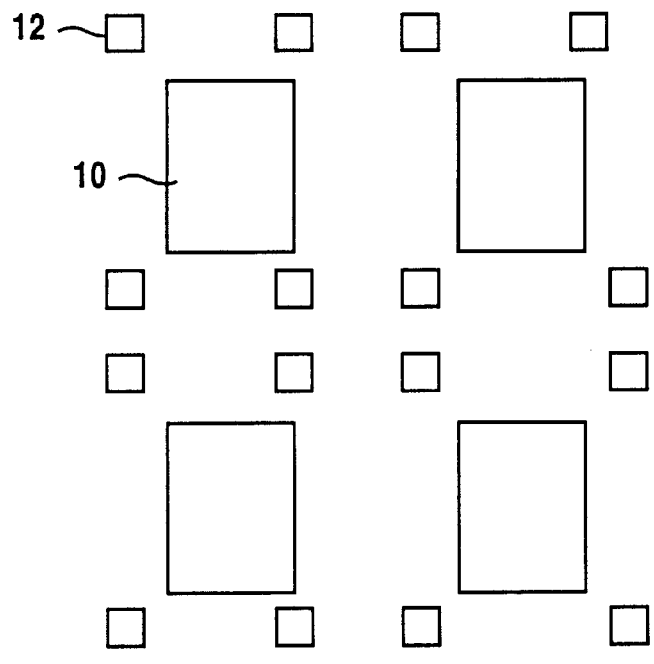
FIG. 2 shows a relationship between a pattern with an auxiliary pattern of a mask and a pattern formed on a wafer (through the mask)
Figure 2:
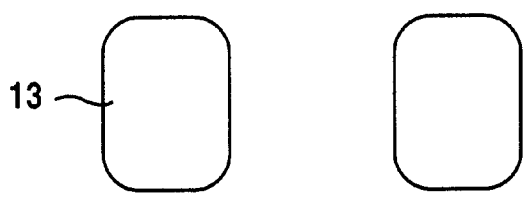
Figure 2:
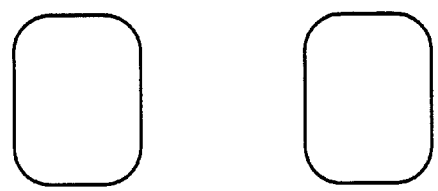
Figure 3:
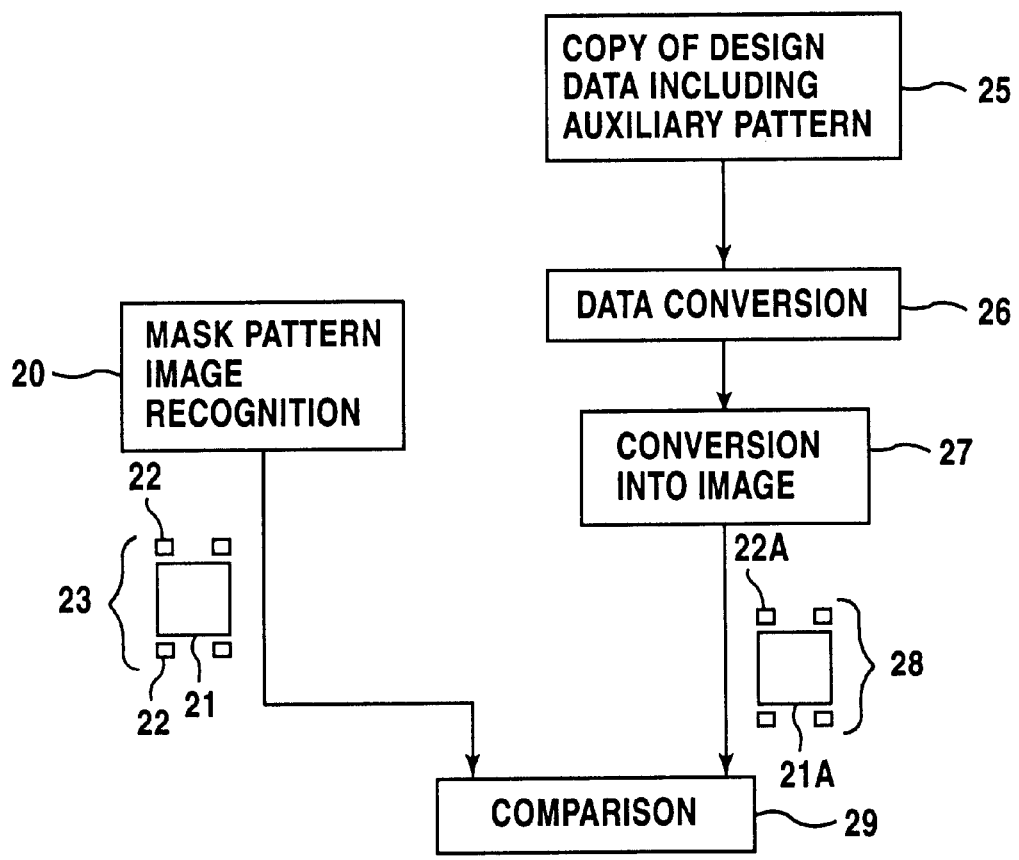
FIG. 3 shows an outline of a pattern inspection method in the related art.
Figure 4:
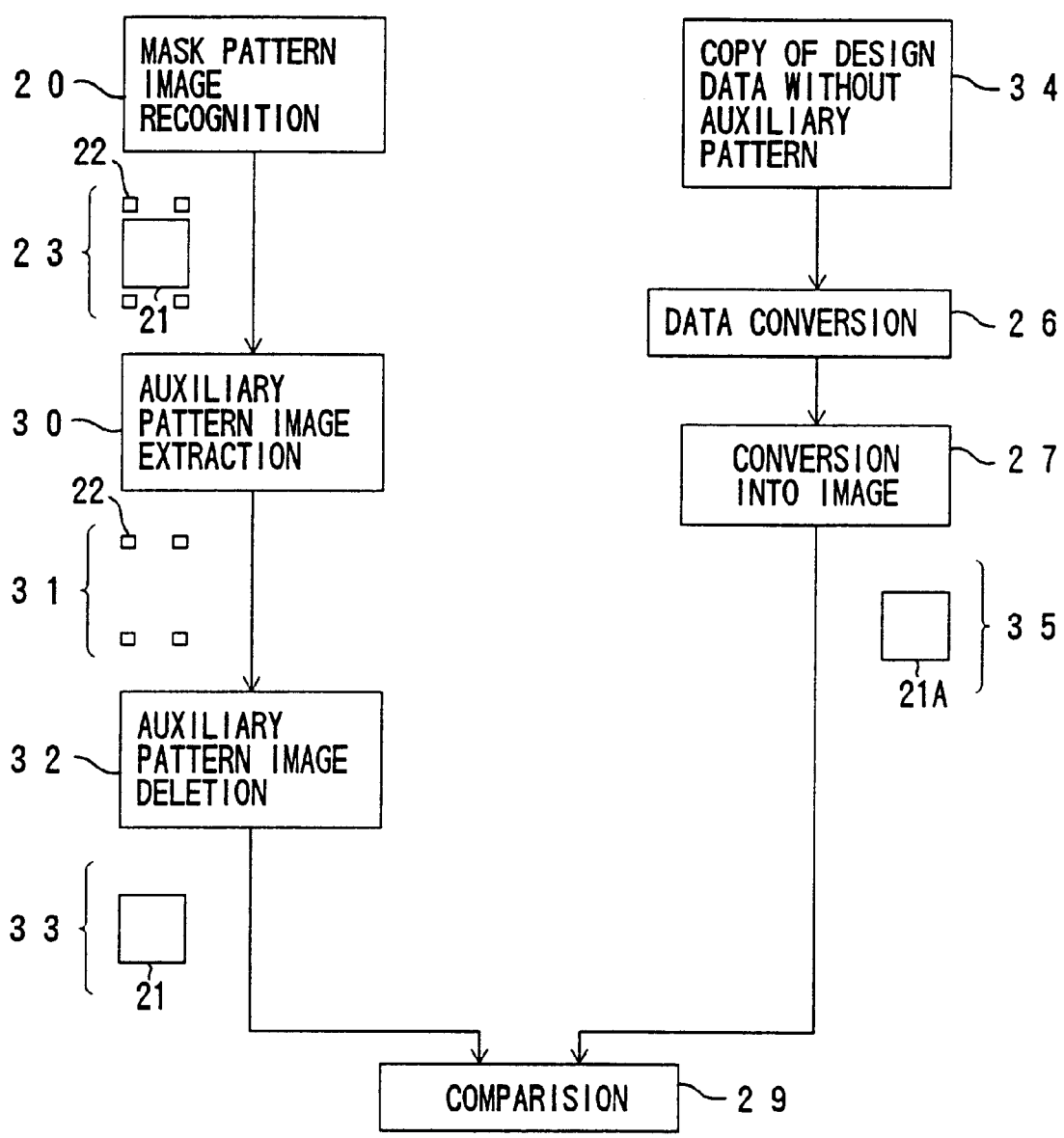
FIG. 4 shows an outline of a data comparison pattern inspection method in a first embodiment of the present invention.

FIG. 4 shows an outline of a data comparison pattern inspection method in a first embodiment of the present invention. In FIG. 4, the same reference numerals are given to the processes which are the same as the processes shown in FIG. 3.

In the process 20, an image of a pattern of a mask is recognized, and a recognized image 23 including a pattern image 21 and an auxiliary pattern image 22 are obtained. Then, in a process 30, the auxiliary pattern image 22 is extracted from the recognized image 23, and an image 31 of only the auxiliary pattern image 22 is obtained. Then, in a process 32, the auxiliary pattern image 22 is deleted from the recognized image 23 including the pattern image 21 and the auxiliary pattern image 22, and an image of only the pattern image 21, that is, an auxiliary-pattern-image-deleted recognized image 33 is obtained.

Figure 5:
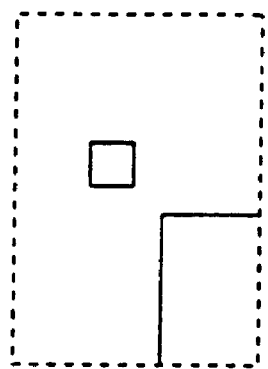
FIG. 5 shows a template of the auxiliary pattern, which is used in a process 30 of FIG. 4.
Figure 5:
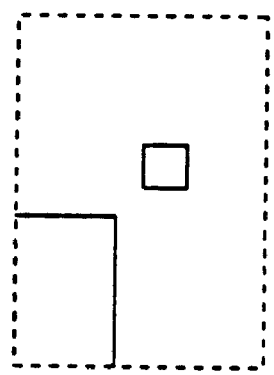
Figure 5:
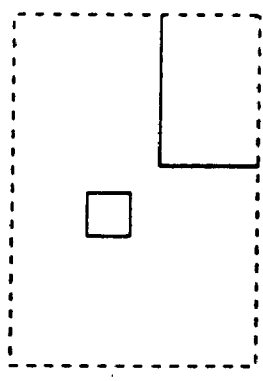
Figure 5:
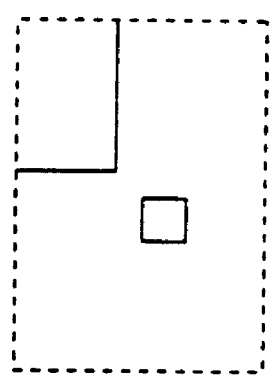
Figure 6A:
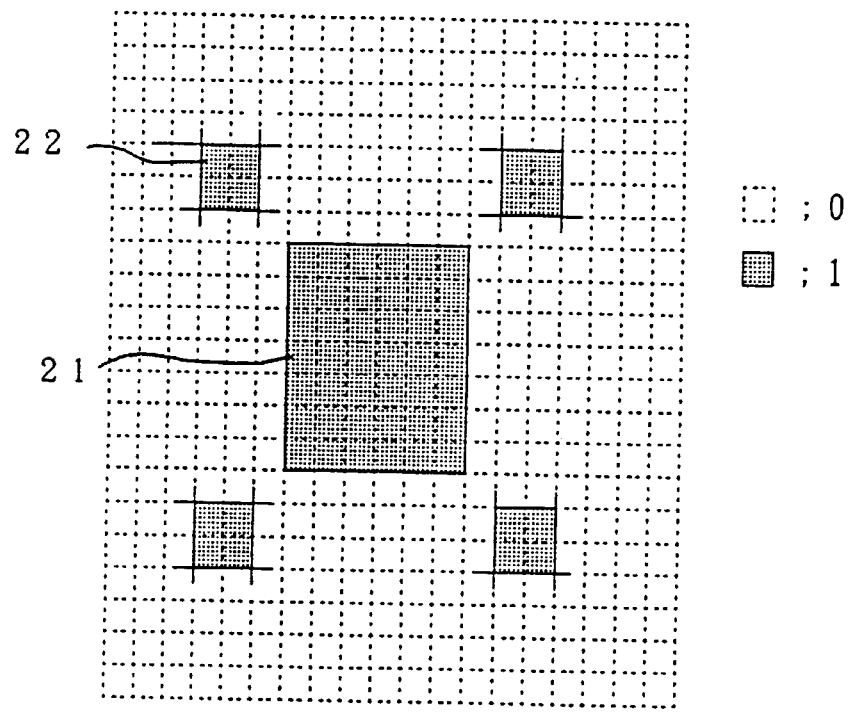
FIGS. 6A and 6B illustrate an operation of a process 32 of FIG. 4.
Figure 6B:
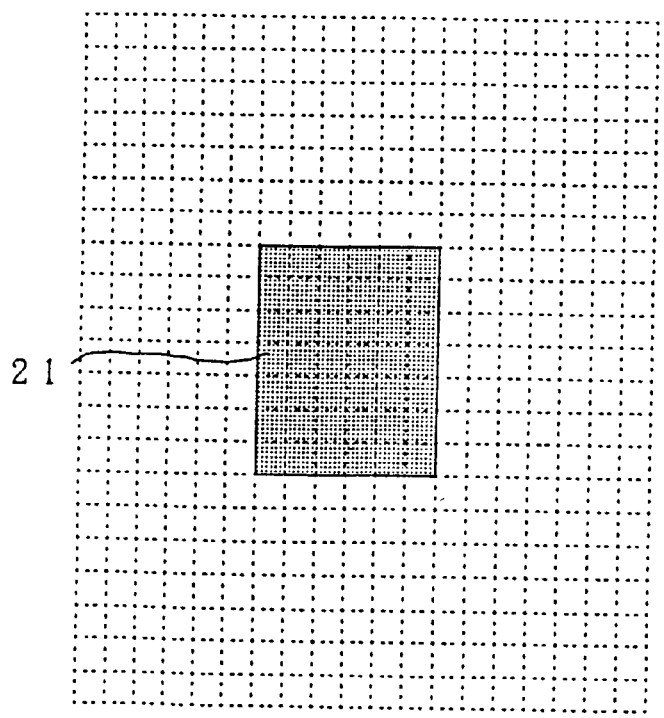

In the process 30, by using a template 40 shown in FIG. 5, presence of the auxiliary pattern image 22 is recognized, and the auxiliary pattern image 22 is extracted from the image memory. In the process 30, as shown in FIGS. 6A and 6B, information '1' of the auxiliary pattern image 22 is changed to '0' and thus the auxiliary pattern image 22 is deleted from the image memory.

On the other hand, in a process 34, design data of only the pattern, that is, the design data without the auxiliary pattern is copied. Then, in the process 26, the design data without the auxiliary pattern is converted into inspection data suitable for inspection, and, in the process 27, the inspection data is converted into an image. Thus, an inspection image 35 of only the pattern 21A is obtained.

In the process 29, the auxiliary-pattern-image-deleted recognized image 33 is compared with the inspection image 35, and thus, it is determined whether or not defects are present in a circuit pattern of the mask.

In this method, because the design data is data without the auxiliary pattern, the amount of data of the design data is very small in comparison to the design data with the auxiliary pattern. Accordingly, the process 26 requires a shorter processing time. Thereby, inspection of the circuit pattern of the mask requires a shorter time.

Further, because the comparison is performed in the process 29 without the auxiliary pattern, occurrence of false defects is reduced. Thereby, the inspection of the circuit pattern of the mask is performed with high accuracy.

The data comparison pattern inspection method shown in FIG. 4 will now be described in detail.

Figure 7:
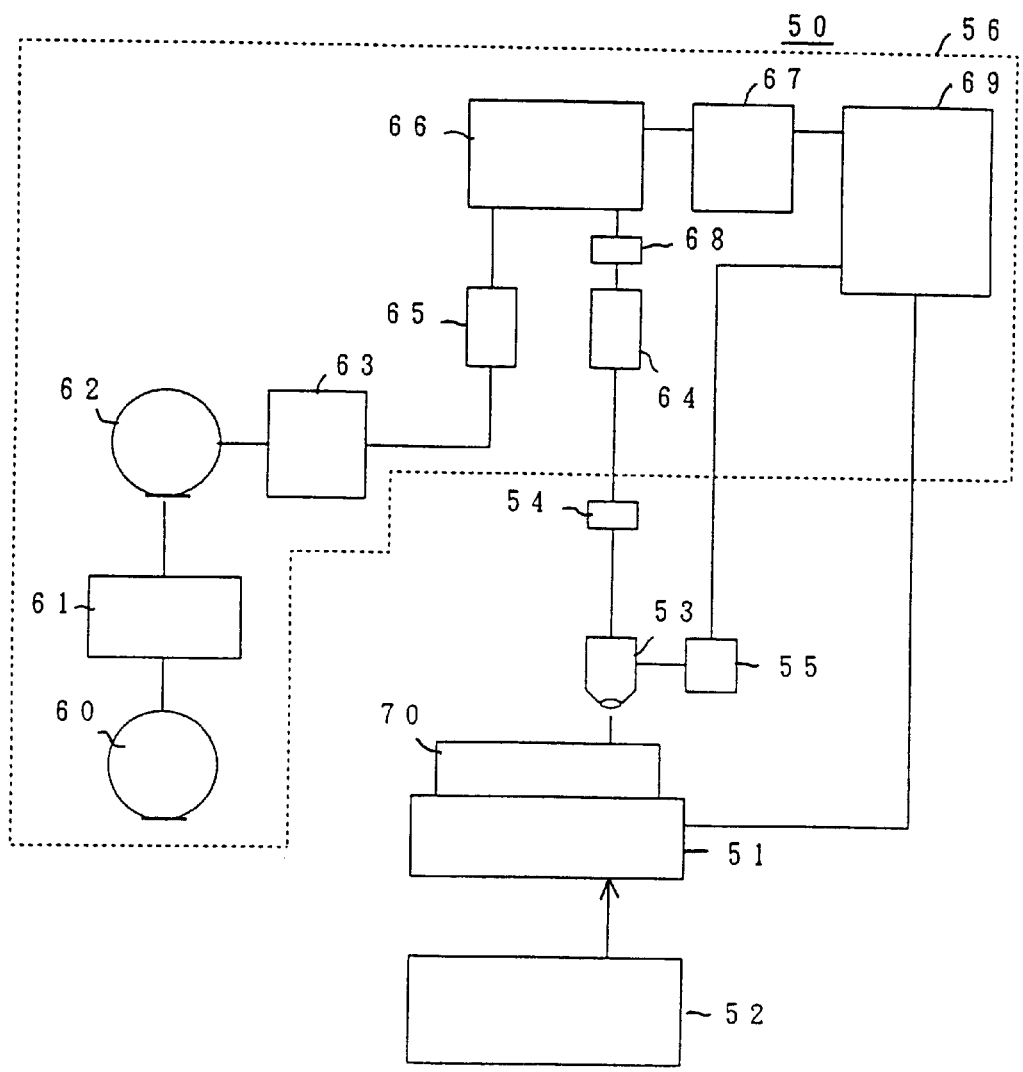
FIG. 7 shows a data comparison pattern inspection apparatus in the first embodiment of the present invention.

FIG. 7 shows a data comparison pattern inspection apparatus 50. The pattern inspection apparatus 50 includes an XY stage 51, a light source 52, an objective lens 53, a CCD 54, an automatic focusing mechanism 55 and a control device 56.

The control device 56 includes a storage 60 storing the design data without the auxiliary pattern, a data converting device 61, a storage 62 storing inspection data, a converting-to-image portion 63, image memories 64 and 65, a pattern processing circuit 66, a slight defect detecting circuit 67, an auxiliary pattern image recognizing and deleting circuit 68 and a system control circuit 69.

When inspection of a circuit pattern of a mask is performed, a mask 70 is fixed onto the XY stage 51. The mask is to be inspected and the circuit pattern is formed in the mask. The light source 52 lights the mask 70. As a result, the mask transmit the light according to the circuit pattern. The automatic focusing mechanism 55 positions the objective lens 53. Through the objective lens 53, the image of a circuit pattern at a predetermined position of the mask 70 is magnified and projected onto the CCD 54. Thereby, the CCD 54 recognizes the circuit pattern at the predetermined position of the mask 70. The image memory 64 temporarily stores the recognized circuit pattern image.

The design data without the auxiliary pattern of the above-mentioned recognized position of the design data without the auxiliary pattern stored in the storage 60 is converted into inspection data through the data converting device 61. The converted data is stored in the storage 62. The stored data is then converted into an image (inspection image), through the converting-to-image portion 63, which is then stored in the image memory 65.

The recognized circuit pattern image is read from the image memory 64 and is provided to the auxiliary pattern recognizing and deleting circuit 68. The auxiliary pattern recognizing and deleting circuit 68 recognizes and deletes the image of the auxiliary pattern. Thus, the auxiliary-pattern-image-deleted recognized image is obtained.

This auxiliary-pattern-image-deleted recognized image and the inspection image read from the image memory 64 are provided to the pattern processing circuit 66. The pattern processing circuit 66 produces an image which is used in the comparison of the two images. Specifically, for example, the pattern processing circuit 66 superimposes the two images with one another, and, with use of the superimposed image, the slight defect detecting circuit 67 detects pattern defects such as unevenness.

The XY stage 51 is moved and a picture of the circuit pattern in another position of the mask 70 is taken by the objective lens 53 and CCD 54. In response thereto, the design data without the auxiliary pattern of the first position of the design data, without the auxiliary pattern stored in the storage 60, is converted into inspection data through the data converting device 61. The inspection data is converted into the inspection image through the converting-to-image portion 63. This inspection image is compared with the above-mentioned recognized mask circuit pattern image. For example, the two images are superimposed with one another and inspection is performed on the superimposed image. By repeating these operations for the entire circuit pattern of the mask 70, an inspection can be made for the presence of slight defects.

Figure 8:
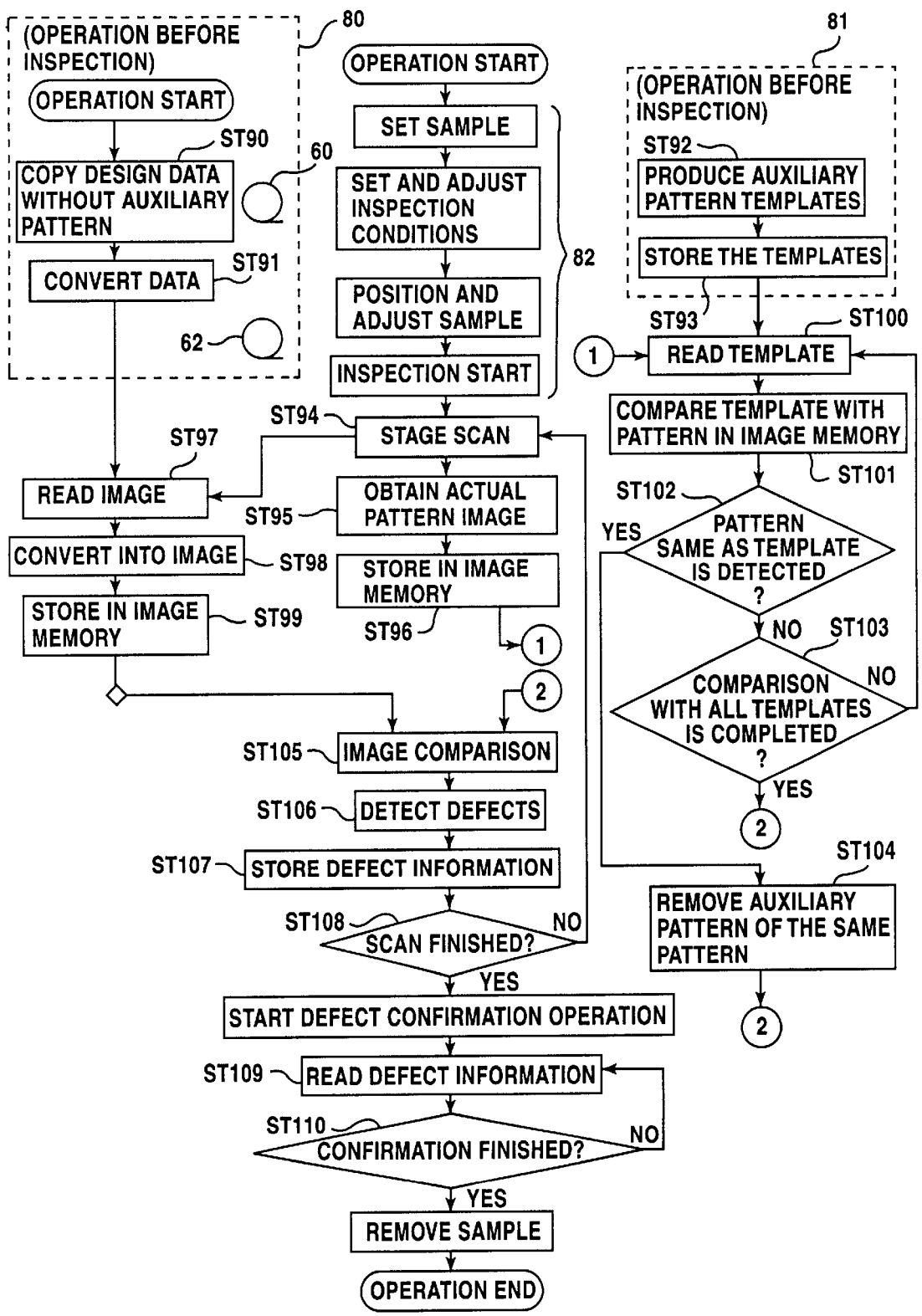
FIG. 8 illustrates the pattern inspection method performed by the pattern inspection apparatus shown in FIG. 7.

With reference to FIG. 8, the pattern inspection operations of the above-described pattern inspection apparatus 50 will now be described.

The control device 56 is a computer. The inspection operations of the pattern inspection apparatus 50 are a combination of operations performed by an operator and operations performed by the computer. The operations performed by the computer are expressed by 'ST' (step).

Prior to the pattern inspection, three operations 80, 81 and 82 are performed. In the first operation 80, the design data without the auxiliary pattern is copied and the copy is stored in the storage 60 (ST90). Then, the design data without the auxiliary pattern is converted into the inspection data which is stored in the storage 62 (ST91). In the second operation 81, auxiliary pattern templates such as the template 40 (shown in FIG. 5) are produced (ST92), and the produced templates are stored in a template memory (ST93). In the third operation 82, the operator sets the mark 70 onto the XY stage 51, sets inspection conditions such as an inspection range, an inspection sensitivity, light intensity of the light source 52, parallelism of the mask 70, and positions the mask 70.

Then, the pattern inspection is started.

The XY stage 51 is moved (ST94), an image of the circuit pattern of the mask 70 is obtained (ST95) and the obtained image is stored in the memory 64 (ST96).

Further, data of the position, corresponding to the moved XY stage 51, of the inspection data stored in the storage 62 is read (ST97), the read data is converted into the inspection image (ST98), and the inspection image is stored in the image memory 65 (ST99).

Further, after ST96, an auxiliary pattern template is read from the template memory (ST100), and the read template is compared with the image stored in the image memory 64 (ST101). Then, when a pattern image the same as the auxiliary pattern template is detected (ST102), the auxiliary pattern of the same pattern image is removed from the image memory 64 (ST104). When a pattern image the same as the auxiliary pattern template is not detected (ST102), another template is read from the template memory and operations the same as the above-mentioned operations are performed for the read template. These operations are performed for all the stored templates (ST103).

Then, the inspection image stored in the image memory 65 and the auxiliary-pattern-image-deleted recognized image resulting from removing the auxiliary pattern through the auxiliary pattern recognizing and deleting circuit 68 are used and an image to be used for comparing the two images is produced. Specifically, for example, superimposition of the two images is performed (ST105), and defects in the circuit pattern recognized image read from the image memory 64 are detected (ST106). Then, defect information is stored in a defect information memory (ST107).

The above-described operations are performed for all the positions of the circuit pattern of the mask 70 (ST108).

After the operations of detecting defects of pattern data have been performed for all the positions of the circuit pattern of the mask 70, a defect confirmation (by the operator) is started.

First, defect information is read from the defect information memory (ST109). This operation is repeated until the operator's confirmation of all the defects is finish (ST110).

After the confirmation of the defects has been finished, the operator removes the mask 70 from the XY stage 51. Thus, the inspection is finished.

A mask-to-mask comparison pattern inspection method in a second embodiment of the present invention will now be described.

Figure 9:
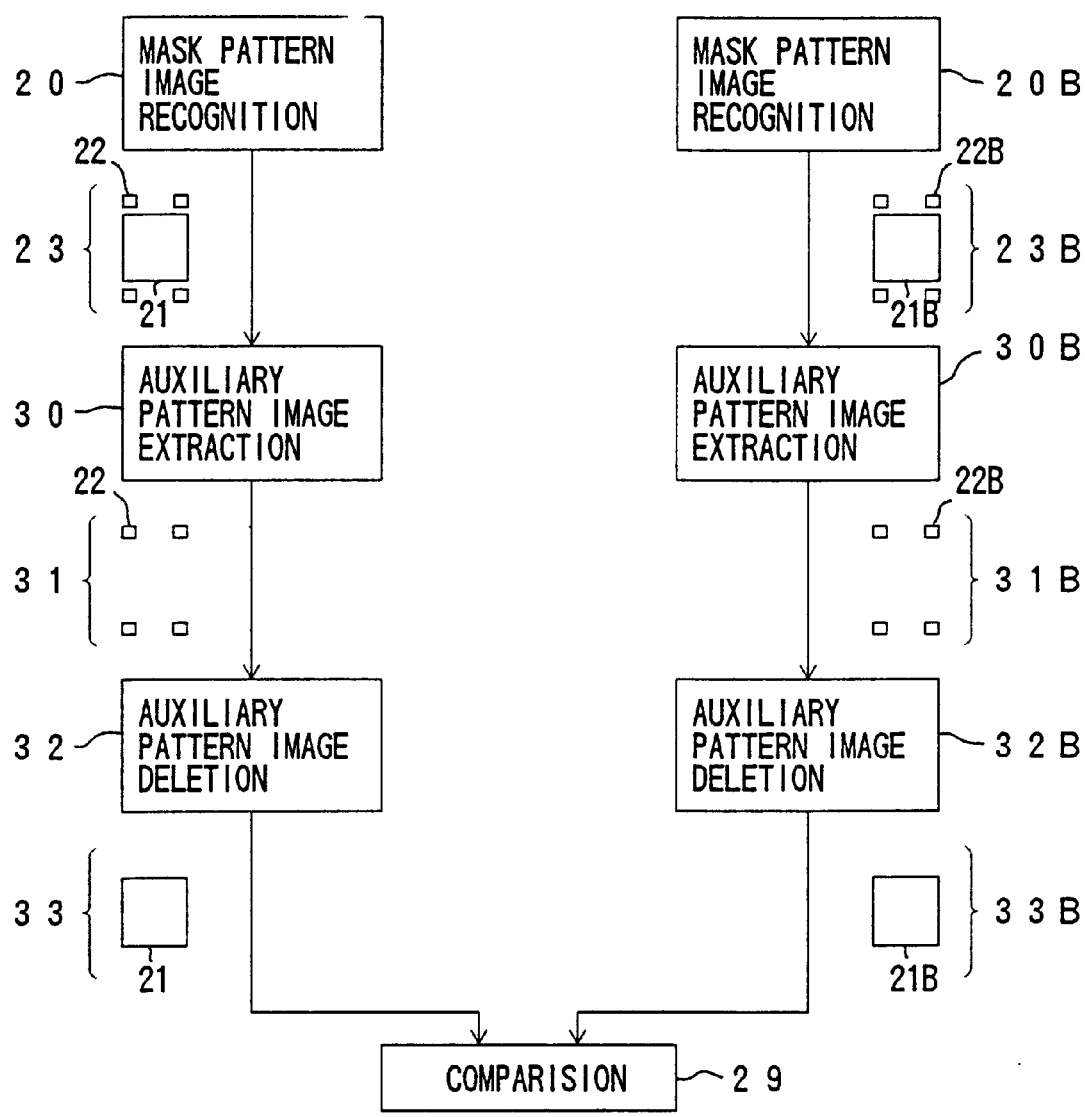
FIG. 9 shows an outline of a mask-to-mask comparison pattern inspection method in a second embodiment of the present invention.

FIG. 9 shows an outline of the mask-to-mask comparison pattern inspection method using regularity of a circuit pattern of a mask. In FIG. 9, the same reference numerals are given to the parts that are the same as the parts shown in FIG. 4. In the process 20, an image of a pattern at a predetermined position of a mask is recognized, and a recognized image 23 including a pattern image 21 and an auxiliary pattern image 22 are obtained. Then, in a process 30, the auxiliary pattern image 22 is extracted from the recognized image 23, and an image 31 of only the auxiliary pattern image 22 is obtained. Then, in a process 32, the auxiliary pattern image 22 is deleted from the recognized image 23 including the pattern image 21 and the auxiliary pattern image 22, and an image of only the pattern image 21, that is, a first auxiliary-pattern-image-deleted recognized image 33 is obtained.

In a process 20B, an image of a pattern at a position of a mask is recognized, at which position the pattern is the same as the pattern formed at the above-mentioned predetermined position. A recognized image 23B including a pattern image 21B and an auxiliary pattern image 22B are obtained. Then, in a process 30B, the auxiliary pattern image 22B is extracted from the recognized image 23B, and an image 31B of only the auxiliary pattern image 22B is obtained. Then, in a process 32B, the auxiliary pattern image 22B is deleted from the recognized image 23B including the pattern image 21B and the auxiliary pattern image 22B, and an image of only the pattern image 21B, that is, a second auxiliary-pattern-image-deleted recognized image 33B is obtained.

In the process 29, the first auxiliary-pattern-image-deleted recognized image 33 is compared with the second auxiliary-pattern-image-deleted recognized image 33B, and thus, it is determined whether or not defects are present in a circuit pattern of the mask.

Because the comparison is performed in the process 29 without the auxiliary pattern, occurrence of false defects is reduced. Thereby, the inspection of the circuit pattern of the mask is performed with high accuracy.

The data comparison pattern inspection method shown in FIG. 9 will now be described in detail.

Figure 10:
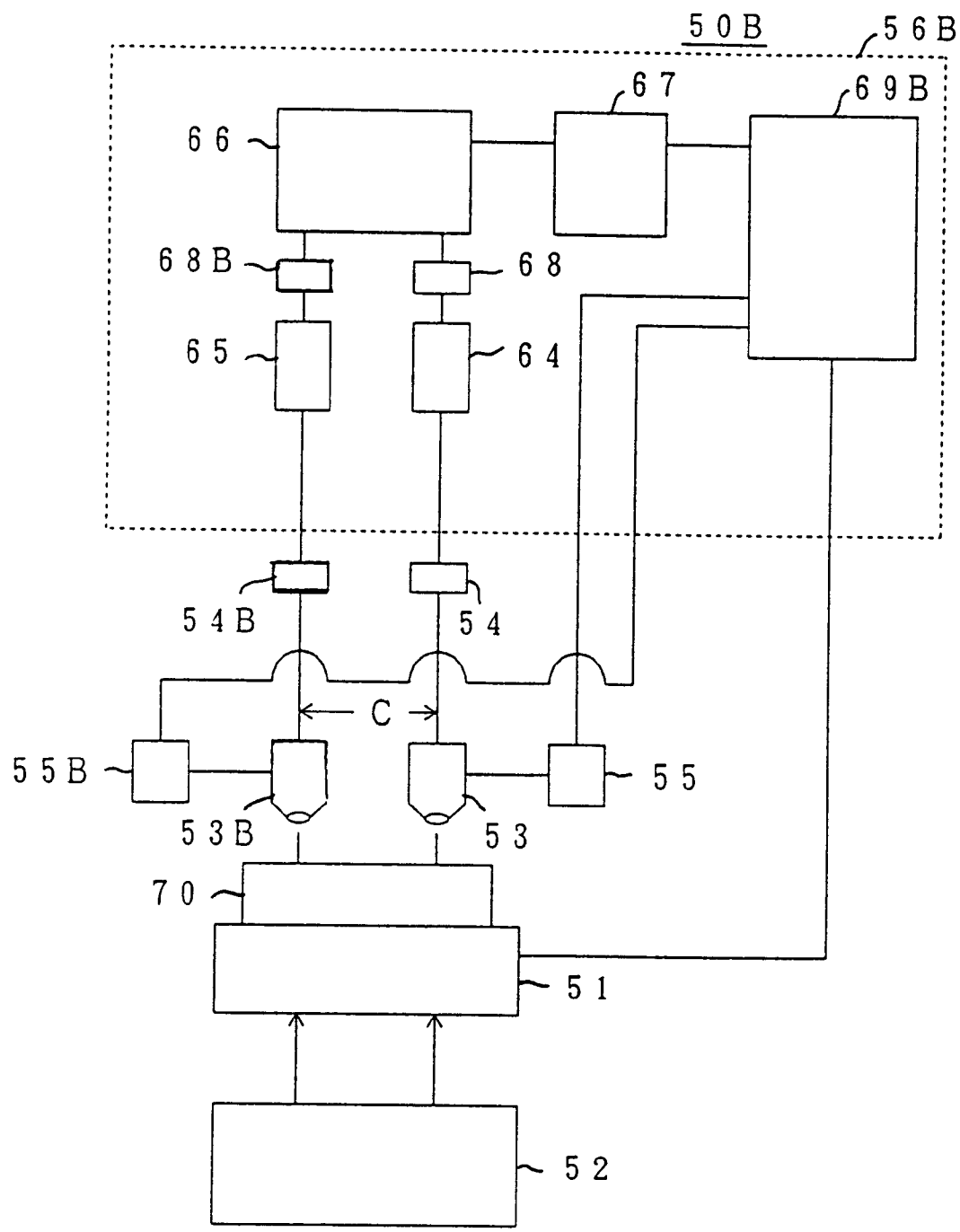
FIG. 10 shows a mask-to-mask comparison pattern inspection apparatus in the second embodiment of the present invention.

FIG. 10 shows a mask-to-mask comparison pattern inspection apparatus 50B. In FIG. 10, the same reference numerals are given to parts that are the same as the parts shown in FIG. 7. The pattern inspection apparatus 50B includes the XY stage 51, the light source 52, the first objective lens 53, the first CCD 54, the first automatic focusing mechanism 55, the second objective lens 53B, the second CCD 54B, the second automatic focusing mechanism 55B and a control device 56B.

The control device 56B includes the image memories 64 and 65, the pattern processing circuit 66, the slight defect detecting circuit 67, the first auxiliary pattern image recognizing and deleting circuit 68, the second auxiliary pattern image recognizing and deleting circuit 68B and a system control circuit 69B.

When inspection of a circuit pattern of a mask is performed, a mask 70 is fixed on the XY stage 51. The mask is to be inspected and the circuit pattern is formed in the mask. The light source 52 lights the mask 70. As a result, the mask transmit the light according to the circuit pattern. The first automatic focusing mechanism 55 positions the first objective lens 53. Through the first objective lens 53, the image of a circuit pattern at a first predetermined position of the mask 70 is magnified and projected onto the first CCD 54. Thereby, the first CCD 54 recognizes the circuit pattern at the first predetermined position of the mask 70. This predetermined position is a right position in FIG. 10. The first image memory 64 temporarily stores the recognized circuit pattern image. Further, the second automatic focusing mechanism 55B also positions the second objective lens 53B. Through the second objective lens 53B, the image of a circuit pattern of another position (a second predetermined position) of the mask 70 is magnified and projected onto the second CCD 54B. Thereby, the second CCD 54B recognizes the circuit pattern at the second predetermined position of the mask 70. The second predetermined position is a left position in FIG. 10. At the second predetermined position, the circuit pattern is formed, which circuit pattern is the same as the circuit pattern formed at the first predetermined position. The second image memory 65 temporarily stores the recognized circuit pattern image.

The recognized circuit pattern image is read from the first image memory 64 and is provided to the first auxiliary pattern recognizing and deleting circuit 68. The first auxiliary pattern recognizing and deleting circuit 68 recognizes and deletes the image of the auxiliary pattern. Thus, the first auxiliary-pattern-image-deleted recognized image is obtained.

Further, the recognized circuit pattern image is read from the second image memory 65 and is provided to the second auxiliary pattern recognizing and deleting circuit 68B. The second auxiliary pattern recognizing and deleting circuit 68B recognizes and deletes the image of the auxiliary pattern. Thus, the second auxiliary-pattern-image-deleted recognized image is obtained.

The first auxiliary-pattern-image-deleted recognized image and second auxiliary-pattern-image-deleted recognized image are provided to the pattern processing circuit 66. The pattern processing circuit 66 produces an image which is used in a comparison of the above-mentioned two image. Specifically, for example, the pattern processing circuit 66 superimposes the two images with one another, and, in use of the superimposed image, the slight defect detecting circuit 67 detects pattern defects such as unevenness.

The XY stage 51 is moved and the first objective lens 53 and the first CCD 54, and the second objective lens 53B and the second CCD 54B take pictures of different positions of the mask 70, the same circuit pattern being formed at the different positions. In the same way as above, the auxiliary pattern images are removed from the circuit pattern images obtained by taking pictures. As a result, the first auxiliary-pattern-image-deleted recognized image and the second auxiliary-pattern-image-deleted recognized image are obtained. These two images are compared and inspected. By repeating these operations, an inspection for the presence of slight defects is performed for the entire circuit pattern of the mask 70.

Figure 11:
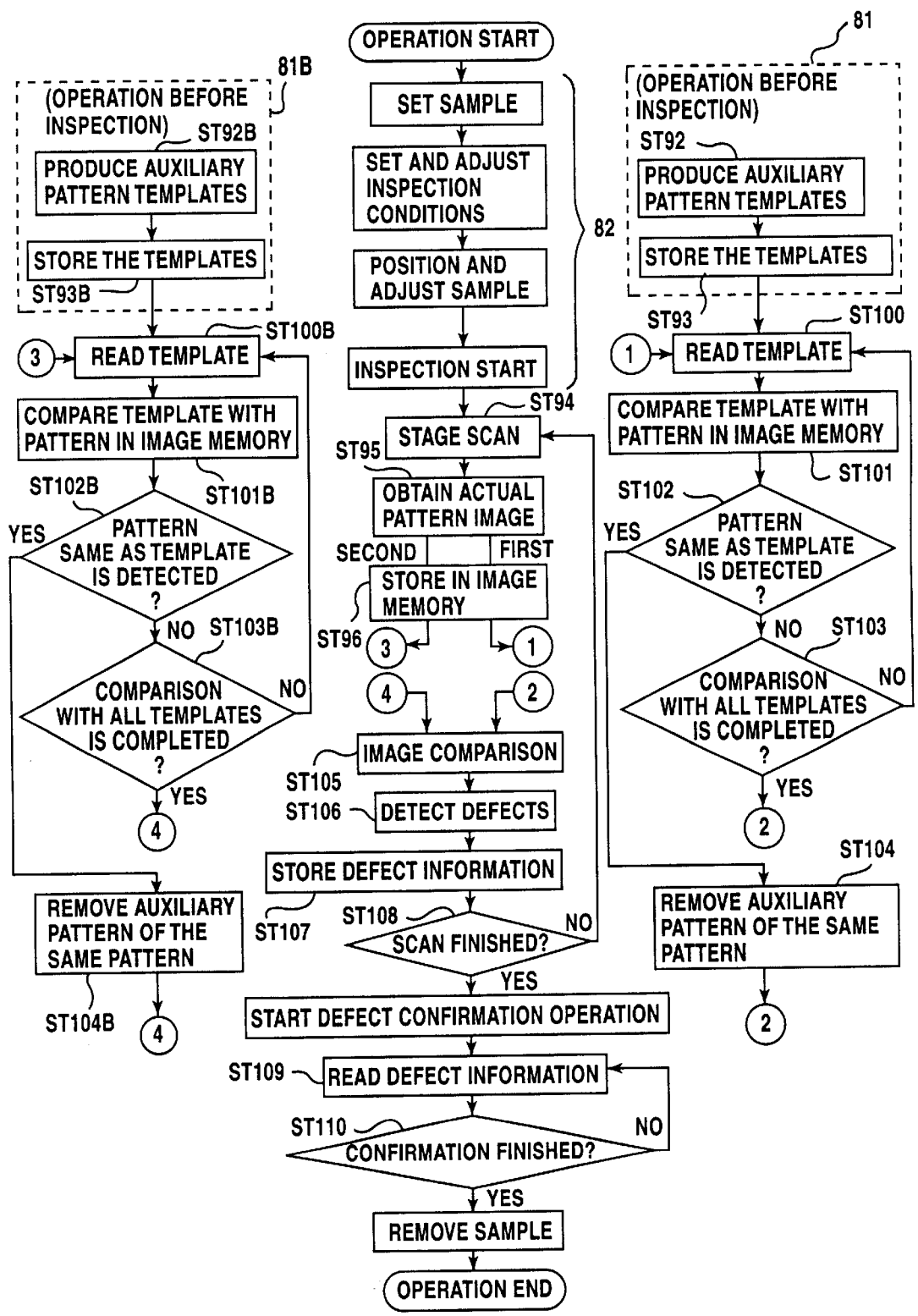
FIG. 11 illustrates the pattern inspection method performed by the pattern inspection apparatus shown in FIG. 10.

With reference to FIG. 11, the pattern inspection operations of the above-described pattern inspection apparatus 50B will now be described.

The control device 56B is a computer. The inspection operations of the pattern inspection apparatus 50B are a combination of operations performed by an operator and operations performed by the computer. The operations performed by the computer are expressed by 'ST' (step).

Prior to the pattern inspection, three operations 81, 81B and 82 are performed. In the first operation 81, auxiliary pattern templates such as the template 40 (shown in FIG. 5) are produced (ST92), and the produced templates are stored in a template memory (ST93). In the second operation 81B, auxiliary pattern templates such as the template 40 are produced (ST92B), and the produced templates are stored in a template memory (ST93B). In the third operation 82, the operator sets the mark 70 on the XY stage 51, sets inspection conditions such as an inspection range, an inspection sensitivity, light intensity of the light source 52, parallelism of the mask 70, and positions the mask 70.

Then, the pattern inspection is started.

The XY stage 51 is moved (ST94), the first objective lens 53, first CCD 54 and the second objective lens 53B, second CCD 54B take images of circuit patterns at two positions of the mask 70, respectively (ST95). The thus-obtained images are stored in the image memories 64 and 65, respectively (ST96).

After ST96, an auxiliary pattern template is read from the template memory (ST100), and the read template is compared with the image stored in the image memory 64 (ST101). Then, when a pattern image the same as the auxiliary pattern template is detected (ST102), the auxiliary pattern of the same pattern image is removed from the first image memory 64 (ST104). When a pattern image the same as the auxiliary pattern template is not detected (ST102), another template is read from the template memory and operations the same as the above-mentioned operations are performed for the read template. These operations are performed for all the stored templates (ST103).

Further, an auxiliary pattern template is read from the template memory (ST100B), and the read template is compared with the image stored in the image memory 65 (ST101B). Then, when a pattern image the same as the auxiliary pattern template is detected (ST102B), the auxiliary pattern of the same pattern image is removed from the second image memory 65 (ST104B). When a pattern image the same as the auxiliary pattern template is not detected (ST102B), another template is read from the template memory and operations the same as the above-mentioned operations are performed for the read template. These operations are performed for all the stored templates (ST103B).

Then, the first auxiliary-pattern-image-deleted recognized image resulting from the auxiliary pattern image being removed from the image stored in the first image memory 64 and the second auxiliary-pattern-image-deleted recognized image resulting from the auxiliary pattern image being removed from the image stored in the second image memory 65 are used and an image to be used for the comparison of the two images is produced. Specifically, for example, superimposition of the two images is performed (ST105), and defects of the first auxiliary-pattern-image-deleted recognized image and the second auxiliary-pattern-image-deleted recognized image are detected (ST106). Then, defect information is stored in a defect information memory (ST107).

The above-described operations are performed for all the positions of the circuit pattern of the mask 70 (ST108).

After the operations of detecting defects of pattern data have been performed for all the positions of the circuit pattern of the mask 70, a defect confirmation (by the operator) is started.

First, defect information is read from the defect information memory (ST109). This operation is repeated until the operator's confirmation of all the defects is finish (ST110).

After the confirmation of the defects has been finished, the operator removes the mask 70 from the XY stage 51. Thus, the inspection is finished.

A mask-to-mask comparison pattern inspection method in a second embodiment of the present invention will now be described.

FIG. 9 shows an outline of the mask-to-mask comparison pattern inspection method using regularity of a circuit pattern of a mask. In FIG. 9, the same reference numerals are given to parts that are the same as the parts shown in FIG. 4. In the process 20, an image of a pattern at a predetermined position of a mask is recognized, and a recognized image 23 including a pattern image 21 and an auxiliary pattern image 22 are obtained. Then, in a process 30, the auxiliary pattern image 22 is extracted from the recognized image 23, and an image 31 of only the auxiliary pattern image 22 is obtained. Then, in a process 32, the auxiliary pattern image 22 is deleted from the recognized image 23 including the pattern image 21 and the auxiliary pattern image 22, and an image of only the pattern image 21, that is, a first auxiliary-pattern-image-deleted recognized image 33 is obtained.

In a process 20B, an image of a pattern at a position of a mask is recognized, at which position the pattern is the same as the pattern formed at the above-mentioned predetermined position. A recognized image 23B including a pattern image 21B and an auxiliary pattern image 22B are obtained. Then, in a process 30B, the auxiliary pattern image 22B is extracted from the recognized image 23B, and an image 31B of only the auxiliary pattern image 22B is obtained. Then, in a process 32B, the auxiliary pattern image 22B is deleted from the recognized image 23B including the pattern image 21B and the auxiliary pattern image 22B, and an image of only the pattern image 21B, that is, a second auxiliary-pattern-image-deleted recognized image 33B is obtained.

In the process 29, the first auxiliary-pattern-image-deleted recognized image 33 is compared with the second auxiliary-pattern-image-deleted recognized image 33B, and thus, it is determined whether or not defects are present in a circuit pattern of the mask.

Because the comparison is performed in the process 29 without the auxiliary pattern, occurrence of false defects is reduced. Thereby, the inspection of the circuit pattern of the mask is performed with high accuracy.

An object to be inspected in the present invention is not limited to a circuit pattern of a mask. In the present invention, any of a circuit pattern of a reticle, a circuit pattern on a wafer, a circuit pattern of a printed circuit board, a pattern of a liquid crystal display and a pattern of a plasma display may be an object to be inspected.

Figure 12:
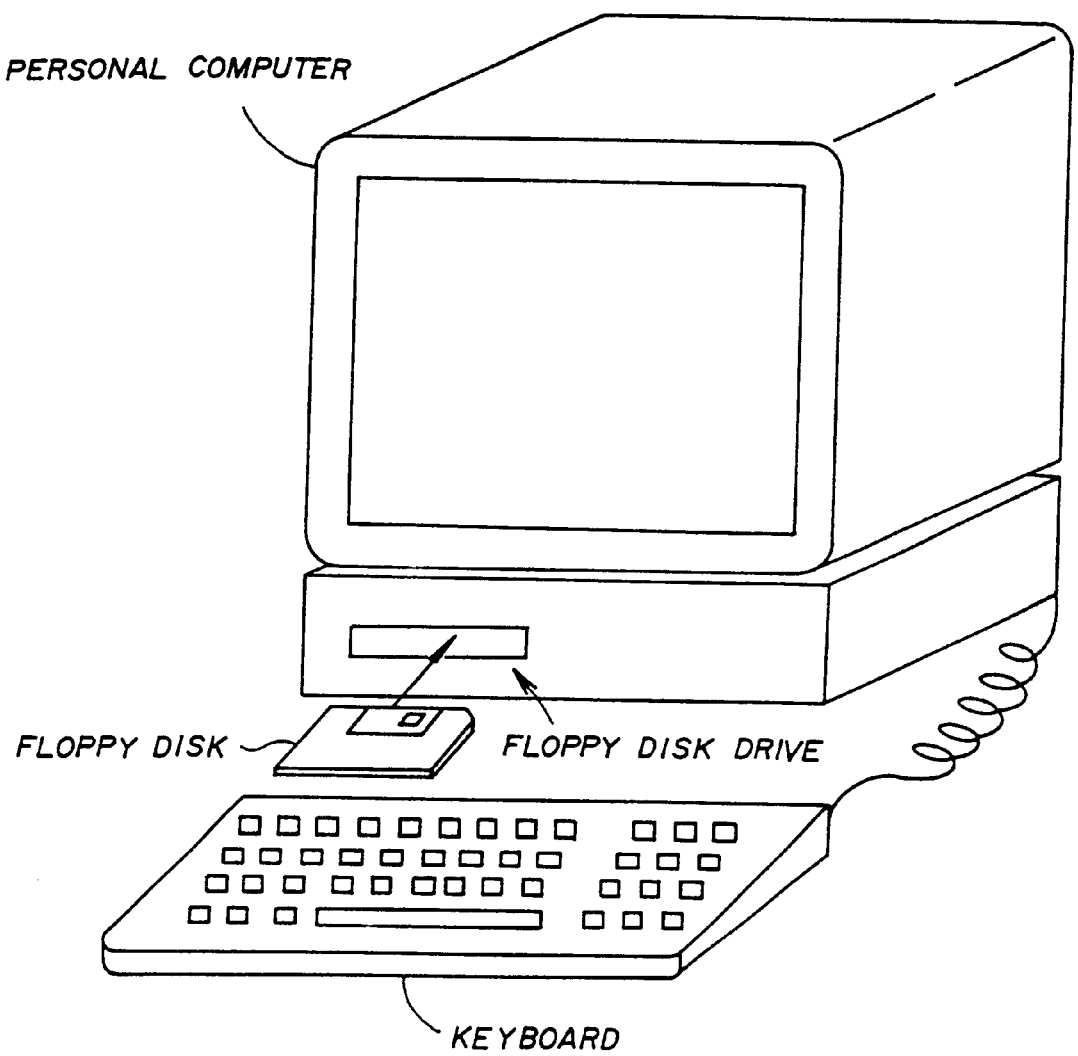
FIG. 12 shows a personal computer which can be used in the present invention.

A general-purpose computer such as a personal computer shown in FIG. 12 can be used for performing the above-described functions of each of the first embodiment and second embodiment. The general-purpose computer is specifically configured by software (stored in any information storage medium such as a floppy disk shown in FIG. 12) executed thereby to carry out the above-described functions.

Further, the present invention is not limited to the above-described embodiments, and variations and modifications may be made without departing from the scope of the present invention claimed in the following claims.

What is claimed is:

1. A pattern inspection method comprising the steps of:
   a) recognizing an actual pattern image of an object to be inspected including an auxiliary pattern in a periphery of a pattern;
   b) deleting the image of said auxiliary pattern from the recognized image and producing an auxiliary-pattern-image-deleted recognized image;
   c) producing an inspection image for inspection, from design data from which the auxiliary pattern is removed; and
   d) comparing said auxiliary-pattern-image-deleted recognized image with said inspection image, wherein
   said auxiliary pattern in the periphery of the pattern comprises sub-patterns positioned near respective corners of the pattern, that enables an approximately same pattern to be obtained therethrough, wherein
   a predetermined template having a shape corresponding to auxiliary pattern and a periphery of the net pattern adjacent thereto is used for recognizing presence of the auxiliary pattern.

2. A pattern inspection apparatus, comprising:
   means for recognizing an actual pattern image of an object to be inspected including an auxiliary pattern in a periphery of a pattern;
   means for deleting the image of said auxiliary pattern from the recognized image and producing an auxiliary-pattern-image-deleted recognized image;
   means for producing an inspection image for inspection, from design data from which the auxiliary pattern is removed; and
   means for comparing said auxiliary-pattern-image-deleted recognized image with said inspection image, wherein
   said auxiliary pattern in the periphery of the pattern comprises sub-patterns positioned near respective corners of the pattern, that enables an approximately same pattern to be obtained therethrough, wherein
   a predetermined template having a shape corresponding to auxiliary pattern and a periphery of the net pattern adjacent thereto is used for recognizing presence of the auxiliary pattern.

3. A pattern inspection apparatus, comprising;
   a recognizing unit which recognizes an actual pattern image of an object to be inspected including an auxiliary pattern in a periphery of a pattern;
   a deleting unit which deletes the image of said auxiliary pattern from the recognized image and produces an auxiliary-pattern-image-deleted recognized image;
   a data converting unit which produces an inspection image used for inspection, from design data from which the auxiliary pattern is removed; and a comparing unit which compares said auxiliary-pattern-image-deleted recognized image with said inspection image, wherein said auxiliary pattern in the periphery of the pattern comprises sub-patterns positioned near respective corners of the pattern, that enables an approximately same pattern to be obtained therethrough, wherein a predetermined template having a shape corresponding to auxiliary pattern and a periphery of the net pattern adjacent thereto is used for recognizing presence of the auxiliary pattern.

4. A computer program product, comprising a computer usable medium having computer readable program code means embodied in said medium, said computer readable program code means comprising:

first program code means for recognizing an actual pattern image of an object to be inspected including an auxiliary pattern in a periphery of a pattern;

second program code means for deleting the image of said auxiliary pattern from the recognized image and producing an auxiliary-pattern-image-deleted recognized image;

third program code means for producing an inspection image used for inspection, from design data from which the auxiliary pattern is removed; and fourth program code means for comparing said auxiliary-pattern-image-deleted recognized image with said inspection image, wherein said auxiliary pattern in the periphery of the pattern comprises sub-patterns positioned near respective corners of the pattern, that enables an approximately same pattern to be obtained therethrough, wherein a predetermined template having a shape corresponding to auxiliary pattern and a periphery of the net pattern adjacent thereto is used for recognizing presence of the auxiliary pattern.

5. A pattern inspection method according to claim 1, wherein said sub-patterns comprise small rectangles positioned near respective corners of a rectangle on the pattern, that enables an approximately rectangular pattern to be obtained therethrough through exposure.

6. A pattern inspection apparatus, according to claim 2, wherein said sub-patterns comprise small rectangles positioned near respective corners of a rectangle on the pattern, that enables an approximately rectangular pattern to be obtained therethrough through exposure.

7. A pattern inspection apparatus, according to claim 3, wherein said sub-patterns comprise small rectangles positioned near respective corners of a rectangle on the pattern, that enables an approximately rectangular pattern to be obtained therethrough through exposure.

8. A computer program product, according to claim 4, wherein said sub-patterns comprise small rectangles positioned near respective corners of a rectangle on the pattern, that enables an approximately rectangular pattern to be obtained therethrough through exposure.

* * * * *